D. Watson,
Mower.
No. 16763
Patented Mar. 3, 1857
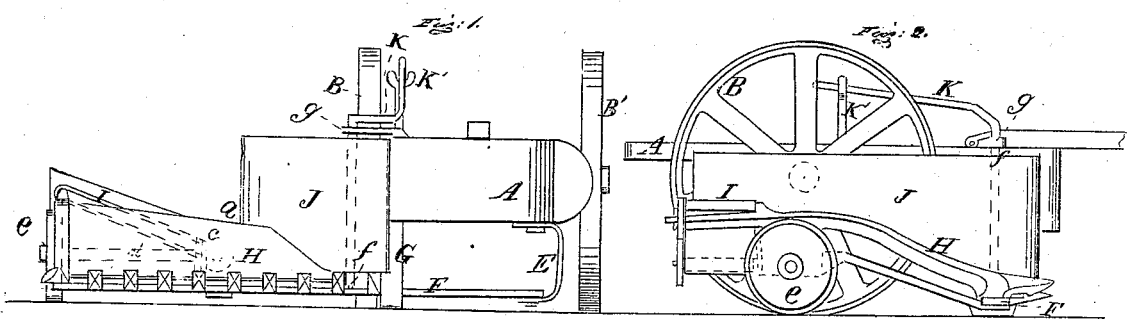
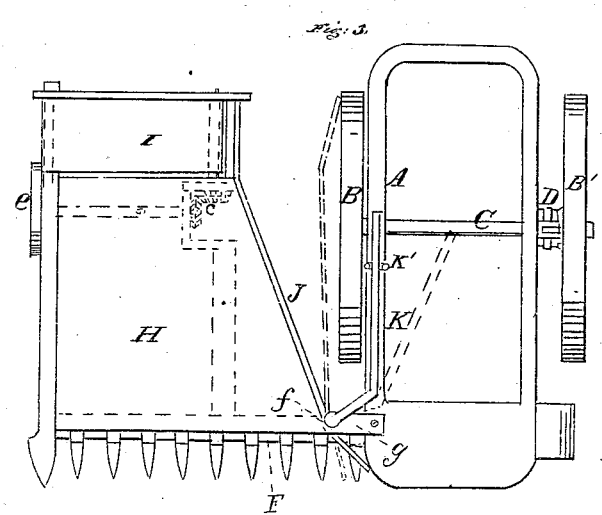

UNITED STATES PATENT OFFICE.

DAVID WATSON, OF NEWARK, NEW JERSEY.

IMPROVEMENT IN HARVESTERS.

Specification forming part of Letters Patent No. 16,763, dated March 3, 1857.

*To all whom it may concern:*

Be it known that I, DAVID WATSON, of Newark, in the county of Essex and State of New Jersey, have invented certain new and useful Improvements in Harvesters; and I do hereby declare that the following is a full, clear, and exact description of the same, reference being had to the accompanying drawings, making a part of this specification, in which—

Figure 1 is a front view of my improvement. Fig. 2 is a side view of the same. Fig. 3 is a plan or top view of the same.

Similar letters of reference indicate corresponding parts in the several figures.

This invention relates to a certain improvement in harvesters, wherein a peculiar provision is made for discharging the cut grain from the platform in sheaves or gavels.

To enable those skilled in the art to fully understand and construct my invention, I will proceed to describe it.

A represents the main frame of the machine, which is supported by the wheels B B', said wheels being attached to their axle C, which rotates with the wheels. The outer wheel, B', is placed loosely on the axle C, and is connected to it by a clutch, D, so that said wheel may be disconnected from its axle when the machine is to be turned in order to allow it to turn more readily.

To the front end of the main frame A and to its under side a spring, E, is attached. This spring is constructed of a steel plate, and its lower end is bent in a horizontal position, and has the end of the finger-bar F firmly bolted to it. The spring E is attached to the frame A near its outer side, as shown clearly in Fig. 1, and the finger-bar consequently extends underneath the frame A nearly its whole width.

To the inner side of the frame A, and in line with the spring E, a pendent guide-loop, G, is attached, through which the finger-bar F passes.

H represents the platform, the front end of which is attached to the finger-bar F. This platform rises with a gradual curve from its front to its back end, as shown in Fig. 2, and the inner side of the platform near its back end inclines downward, as shown at *a* in Fig. 1.

At the back end of the platform H an endless apron, I, is placed. This apron is inclined corresponding to the inclination of the back part of the platform H. The apron I is operated by gearing *c* from the axle *d* of the wheel *e* at the outer side of the platform H, as shown by the dotted lines in Figs. 1 and 3. The inner side of the platform H is not parallel with its outer side, but gradually recedes from the main frame from its front to its back end, as shown clearly in Fig. 3. The back end of the platform, therefore, is considerably narrower than the front end.

J represents a gate, the front end of which is attached to a vertical rod, *f*, the lower end of which is stepped in the finger-bar F, the upper end passing through a guide, *g*, attached to the main frame A. The upper end of the rod *f* has an arm or lever, K, attached to it. The gate J extends back as far as the outer end of the endless apron I, and when the gate is placed by the side of the platform H, as shown in Figs. 1 and 3, it prevents the cut grain from passing off the platform; but when the gate is opened or moved by the side of the main frame, as shown in red in Fig. 3, the cut grain is carried off by the endless apron I, said apron acting upon the outer parts of the stalks, and causing the grain to pass obliquely off the inner corner of the back end of the platform.

The gate J may be kept closed by having a forked upright, K', placed in the main frame to receive the arm or lever K. The gate J is operated by the driver, and it will be seen that when the gate J is closed the cut grain is prevented from passing off the platform, and consequently by opening the gate at intervals the cut grain will be discharged in gavels or sheaves from the platform, and the size of the gavels or sheaves may be varied, as desired, according to the rapidity with which the gate is operated.

In consequence of having the finger-bar F attached to the spring E the sickle is allowed to rise and fall, so that it may conform to the inequalities of the ground, and as the spring E is placed near the outer side of the main frame, and as the finger-bar F is extended underneath the main frame, it will consequently yield or "give" readily to the inequalities of the ground, and will operate evenly and smoothly, much more so than if the attachment were at the inner side of the main frame.

It will be seen that the gavels or sheaves may all be discharged from the platform of the same size, whether the crop of grain be heavy or light, for as the gate J is operated by the driver at will, it may, when the crop is light, be operated at longer intervals, so that the requisite amount of cut grain to form a proper-sized gavel or sheaf may pass upon the platform during the intervals between the opening of the gate.

It will be seen that the gate J, when used in combination as above described and set forth, performs a double function—viz., that of preventing the cut grain from falling on the ground only at stated intervals, and that of a guard, when open, to prevent the grain forming the gavel or sheaf from becoming entangled and scattered on the ground by striking against the inner wheel, B'.

I do not claim, separately, an endless apron for discharging the cut grain from the platform, for endless aprons, and in some cases gates, have been previously used for the same purpose; but,

Having thus described my invention, what I claim as new, and desire to secure by Letters Patent, is—

The gate J, in combination with the inclined endless apron I and platform H, when arranged and operated in the manner and for the purpose specified.

DAVID WATSON.

Witnesses:
  W. TUSCH,
  J. W. COOMBS.